March 7, 1939.  J. POTTS  2,149,311
RAT TRAP
Filed June 9, 1936
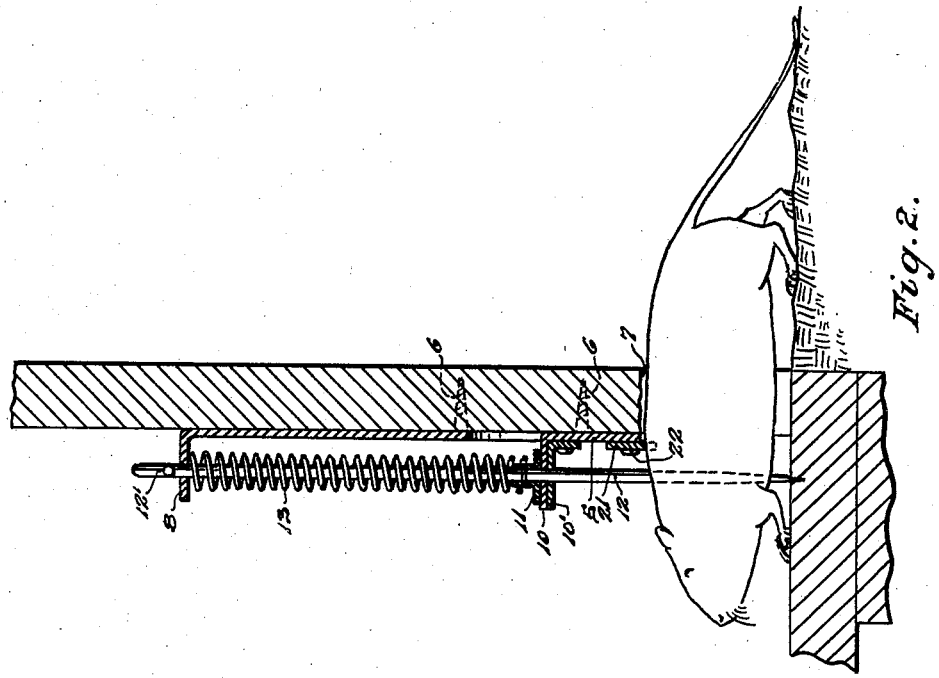
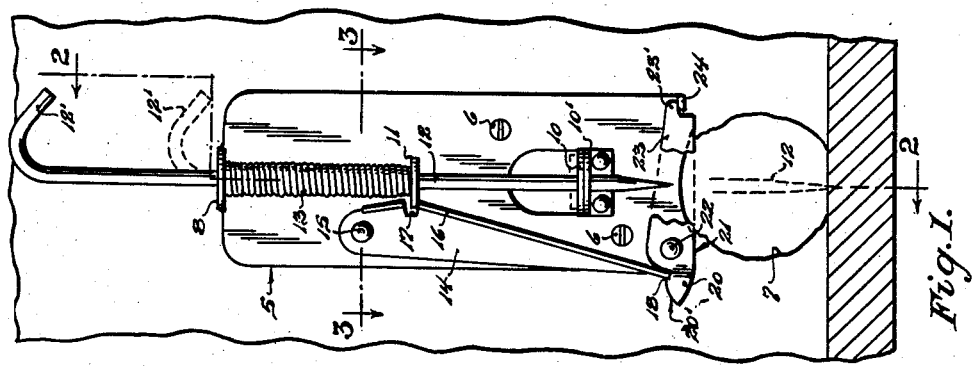
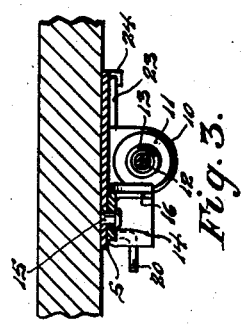
INVENTOR.
James Potts
BY
ATTORNEYS.

Patented Mar. 7, 1939

2,149,311

UNITED STATES PATENT OFFICE 2,149,311

RAT TRAP

James Potts, Selleck, Wash.

Application June 9, 1936, Serial No. 84,280

5 Claims. (Cl. 43—79)

This invention relates to rat traps and particularly is directed to that character of trap in which a spring-loaded striker is caused to impinge the body of the rat, the object of the invention, stating the same generally, being to provide an especially simple, reliable, and highly efficient rat trap having the parts so arranged as to permit ready installation at a point where entrance of the rat to a building or the like will spring the trap and which permits installation in such a manner that the suspicions of the rodent are not excited.

With the above and still more particular ends in view, the nature of which will readily appear in the course of the following detailed description and claims, the invention consists in the novel construction, adaptation, and combination of parts hereinafter described and claimed.

In the drawing:—

Figure 1 is a front elevation representing the now preferred embodiment of the invention as the same is applied above a rat-hole, full and dotted lines being used to illustrate the loaded and sprung position of the striker.

Fig. 2 is a longitudinal vertical section taken on the line 2—2 of Fig. 1 with the parts shown in sprung position following the entrance of the indicated rodent through the rat-hole; and Fig. 3 is a horizontal section taken on the line 3—3 of Fig. 1.

The frame for the trap is desirably comprised of a metal plate 5 provided with suitable apertures by which the same is attached, as by screws 6, to the wall of a building above a rat-hole 7, said plate at its upper end and on the approximate longitudinal median line of the same providing an apertured extension which is turned outwardly at right angles to form a lug 8 operating as the upper bearing for a slidably supported striker. A lower bearing vertically aligned with the upper bearing comprises an apertured lug 10 expressed from the material at right angles to the plate surface with a re-inforcing backing member 10' being provided therefor. Said striker is in the form of a spike 12 having its lower end pointed to impinge the rodent and providing a curved upper end 12' serving as a finger grip for setting the trap. As a power load for the striker I employ a coil spring 13 which is received between the upper bearing 8 and a fixed collar 11 carried by the striker.

Arranged to one side of the striker is a setting lever 14 of L-shaped transverse sectional contour fulcrumed at its upper end about a rivet or the like 15, said L-shape of the lever providing a flange 16 along the inner edge which, immediately below the fulcrum, is cut away to form a notch 17 adapted to receive the collar 11 in the loaded position of the striker. The flange recedes outwardly below the notch as indicated in Fig. 1 and the lower extremity thereof fits a notch 18 formed in the outer short arm 20 of a locking lever 21 which is fulcrumed as at 22 in laterally off-set relation to the plane of striker movement. Said locking lever lies in a relative horizontal plane with the oppositely disposed long arm 23 of the same acting as the trigger for the trap, being located in position such that the lower edge of the trigger normally projects slightly into the space defining the upper limits of the rat-hole.

I have designed the trap in a manner whereby the lever 14 and the trigger 21 are set automatically in response to spring-compressing retraction of the striker and to provide this action the gravitationally-elevated latching arm 20 is formed with a sloping edge 20' inclining upwardly to the notch 18. For positioning this edge in the path of movement of the setting lever 14, the trigger arm 23 is terminally formed with a finger 23' engageable with a stop-lug 24 turned outwardly from the plate. The retractive movement of the collar lodges the same in the notch 17, continued elevation thereof contacting the upper wall of the notch to draw the free end of the setting arm inwardly and depress the locking arm 20 with resulting admission of the lower edge of the flange 16 in the notch 18.

In entering the rat-hole, the back of the rodent rubs against the trigger 23 to elevate the same, resulting slight depression of the locking arm 20 disengaging the setting lever from its latched position. The stored power of the released spring drives the spike through the body of the rat.

I intend that no limitations be implied except as the same may be expressly set forth in the hereto annexed claims.

What I claim is:

1. A spring-loaded rat trap employing a striker formed with a pointed end adapted to be driven through the body of the rat comprising, in combination with the striker, a frame-plate providing a pair of vertically-spaced integral lugs turned at right angles to the plane of the plate surface to act as bearings for the slidable reception of the striker, a collar fixed to said striker between the bearings, a coil spring carried by the striker between said collar and the upper bearing, a setting lever supported to one side of the striker and formed to an approximate L-configuration in transverse section to provide a flange extending along the inner edge of the same, the fulcrum for said setting lever being located at the upper end of the same and said flange being cut away at a point immediately below the horizontal plane of the fulcrum to provide a notch disposed to receive the collar in the retracted spring-compressed position of the striker, and a medially-fulcrumed locking lever acting to releasably secure the setting lever against spring-influenced dislodgment of the collar from said notch, said locking lever providing a notch in the upper edge of one arm thereof and being supported to lie in a relative horizontal plane to locate the notch in position whereat the free terminal of the setting lever is received therein and to locate the other arm in position whereat the same lies in the predetermined path of movement of the rat to act as a trigger for depressing the locking arm to release the striker following elevational contact of the rat with the trigger arm.

2. The structure as defined in claim 1 wherein said notched arm of the locking lever is elevated under the influence of gravity upon the trigger arm, means being provided for preventing gravitational movement of the trigger arm below the set position of the same and said notched arm being provided with an upwardly inclined edge leading to the notch whereby the free end of the setting lever is automatically introduced to the notch in response to engagement of the collar against the upper wall of the notch therefor as the striker is retracted to compress the spring.

3. A spring-loaded rat trap employing a striker formed with a pointed end adapted to be driven through the body of the rat and comprising, in combination with the striker, a frame-plate providing bearings for the striker slidably supporting the same for movement in a vertical plane, a coil spring surrounding the shank of the striker, a collar fixed to the shank of the striker and engaged by the spring for driving the striker, a setting arm supported for swinging movement in a relative vertical plane and providing means adapted to engage the collar in the spring compressed position of the same for releasably securing the striker in its spring-loaded position, and rat-tripped perpendicularly movable means releasably engaging said setting arm in the collar-engaging position of the same to normally lock the setting arm against movement, the frame-plate providing a stop lug associated with the last-named means to normally locate the same both in position whereat the setting arm is engaged thereby in the collar-engaging position of the latter and the locking means lies in the predetermined path of movement of the rat.

4. A spring-loaded rat trap comprising a striker formed with a pointed end adapted to be driven through the body of the rat, a flat frame plate supporting said striker for sliding movement in an approximate vertical plane and providing means by which the trap is attached to a wall above the opening from a rat run, a coil spring carried by the shank of the striker, a spring-compressing collar fixed to the shank of the striker, a fulcrumed arm providing collar-engaging means for setting the striker in its spring-loaded position, and means adapted to be tripped by the rat for releasably locking the setting arm in its collar-engaging position, said last-named lock means being gravitationally held in its arm-locking position.

5. A spring-loaded rat trap employing a striker formed with a pointed end adapted to be driven through the body of the rat and comprising, in combination with the striker, a collar carried by the striker, and a spring operatively associated therewith and loaded by the retraction of the collar for driving the striker in its rat-impaling movement, a supporting frame for the striker consisting of a metal plate having bearings at the top and bottom for the slidable reception of the striker, said lower bearing comprising a lug expressed from the plate to lie at right angles to the plane of the plate surface, said lower bearing operating as a stop to limit the movement of the collar under the driving influence of the spring, an L-shaped member having one arm thereof fixed to the plate and its other arm supplementing the expressed lug as a reinforcement therefor to off-set the impact shock of the collar, a setting lever supported by the frame to engage the collar in the spring-loaded position of the latter, and a rat-tripped locking lever also supported by the frame and acting to releasably hold the setting lever in its collar-engaging position.

JAMES POTTS.